United States Patent
Oettinger et al.

(10) Patent No.: US 6,847,754 B2
(45) Date of Patent: Jan. 25, 2005

(54) COORDINATED AXIS SEEKS WITH A MICRO-ELECTRO-MECHANICAL MIRROR

(75) Inventors: Eric G. Oettinger, Rochester, MN (US); Mark D. Heminger, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 81 days.

(21) Appl. No.: 10/151,787

(22) Filed: May 20, 2002

(65) Prior Publication Data

US 2003/0215174 A1 Nov. 20, 2003

(51) Int. Cl.$^7$ .............................. G02B 6/12; G02B 6/26
(52) U.S. Cl. ...................... 385/18; 359/566; 385/147
(58) Field of Search ......................... 385/16–39, 147; 359/566, 569, 831, 837, 871, 838, 230, 224, 198, 214, 221, 223, 226, 298, 124, 127, 128, 110; 398/115, 118, 119

(56) References Cited

U.S. PATENT DOCUMENTS 6,408,120 B1 * 6/2002 Dautartas ..................... 385/52
6,424,757 B1 * 7/2002 Sparks et al. ................. 385/16
6,427,038 B1 * 7/2002 Britz et al. ................... 385/18
6,535,663 B1 * 3/2003 Chertkow .................... 385/18
2002/0122616 A1 * 9/2002 Burns ......................... 385/16
2002/0171953 A1 * 11/2002 Yang .......................... 359/877
2004/0028320 A1 * 2/2004 Schroeder et al. ............ 385/18

* cited by examiner

Primary Examiner—Akm Enayet Ullah
(74) Attorney, Agent, or Firm—William B. Kempler; W. James Brady, III; Frederick J. Telecky, Jr.

(57) ABSTRACT

A method of moving a MEM system mirror in a well defined trajectory that allows longer seeks to be used to reach a target position as compared with known methods that employ small step sizes due to lack of well defined seek trajectories. One method uses the same seek trajectory (scaled in amplitude for seek length) for both axes (x-axis and y-axis) associated with the MEM mirror. This forces both axes to take the same length of time and to use the same "shape" to perform the move, and results in a straight line path between two points. Multiple straight line moves can be employed to provide a more complex trajectory. Another method uses a different trajectory with the same length, but a different shape, for each axis to force the MEM mirror along substantially any desired path such as an arc and/or straight line, among others.

14 Claims, 1 Drawing Sheet

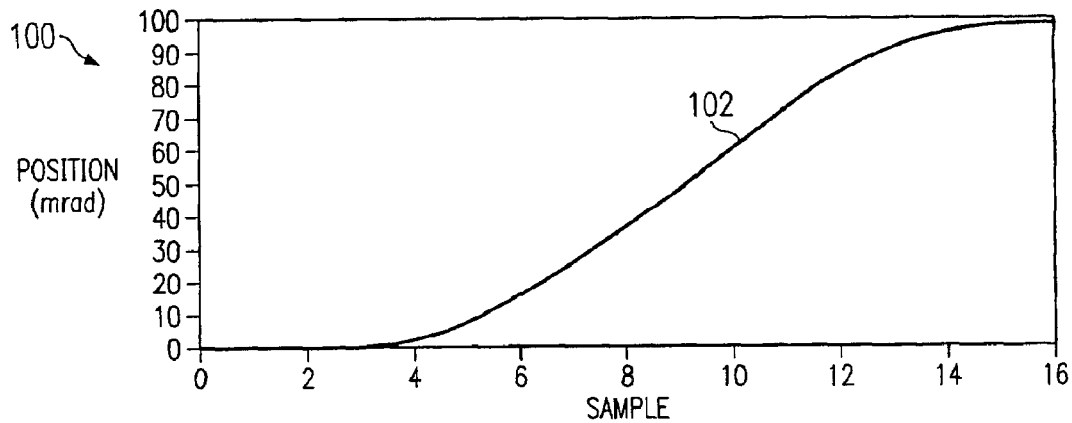

FIG. 1

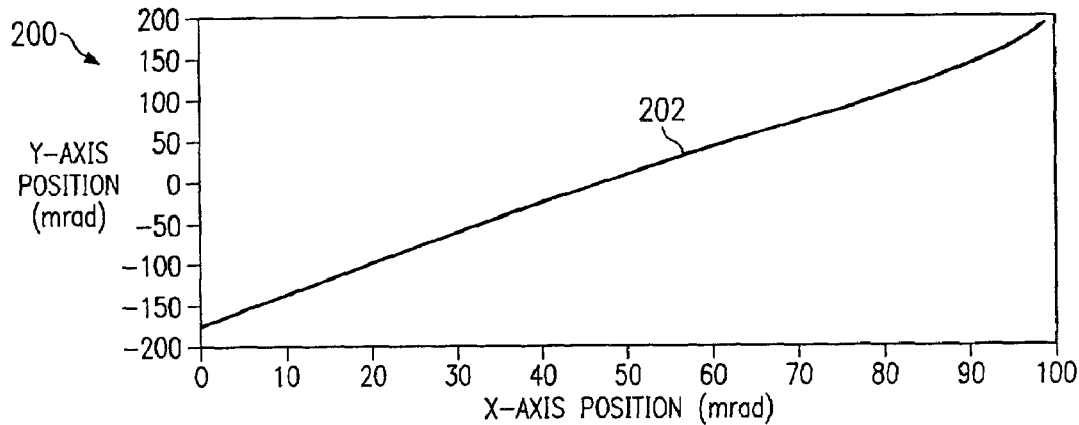

300
- DEFINE MEMS MIRROR SEEK TRAJECTORY BETWEEN TWO POINTS
- CONTINUOUSLY RE-POSITION MEMS MIRROR USING ONE OF THE TWO POINTS AS A STARTING POINT AND THE REMAINING POINT AS THE END POINT, WHEREIN THE MEMS MIRROR X-AXIS AND Y-AXIS ARE BOTH FORCED TO USE THE SAME DEFINED SEEK TRAJECTORY DURING THE RE-POSITIONING PROCESS

FIG. 4

400
- DEFINE A MEMS MIRROR FIRST SEEK TRAJECTORY BETWEEN TWO PREDETERMINED POINTS — 402
- DEFINE A MEMS MIRROR SECOND SEEK TRAJECTORY BETWEEN THE SAME TWO PREDETERMINED POINTS — 404
- CONTINUOUSLY RE-POSITION THE MEMS MIRROR USING ONE OF THE TWO PREDETERMINED POINTS AS A STARTING POINT AND THE REMAINING PREDETERMINED POINT AS THE END POINT, WHEREIN THE MEMS MIRROR X-AXIS IS FORCED TO USE THE FIRST SEEK TRAJECTORY WHILE THE MEMS MIRROR Y-AXIS IS FORCED TO USE THE SECOND SEEK TRAJECTORY DURING THE RE-POSITIONING PROCESS, SUCH THAT THE MEMS MIRROR FOLLOWS A DESIRED COMPOSITE TRAJECTORY — 406

COORDINATED AXIS SEEKS WITH A MICRO-ELECTRO-MECHANICAL MIRROR

BACKGROUND OF THE INVENTION

1. Field of the Invention

This invention relates generally to a micro-electromechanical (MEM) mirror, and more particularly, to a method of coordinating MEM mirror seeks on multiple axes.

2. Description of the Prior Art

When moving a MEM system mirror, the trajectory which is traversed is very often important. Some applications require, for example, positioning a laser beam from point 'A' to point 'B', but avoiding point 'C' in the process. Such positioning is in fact crucial in the optical switch market.

Known methods of moving a MEM system mirror employ small step sizes due to lack of well defined seek trajectories. Without defining seek trajectories, the path that the mirror takes is much less well defined, possibly forcing wider clearances than desirable, and/or slower overall move times from point to point if the step size must be reduced.

In view of the foregoing, it would be both desirable and advantageous in the optical switch art to provide a technique for moving a MEM system mirror in a well defined trajectory that allows longer seeks to be used to reach a target position. It would also be advantageous if the technique provided a fast overall move time relative to the known methods that employ small step sizes due to lack of well defined seek trajectories.

SUMMARY OF THE INVENTION

The present invention is directed to a method of moving a MEM system mirror in a well defined trajectory that allows longer seeks to be used to reach a target position as compared with known methods that employ small step sizes due to lack of well defined seek trajectories. One embodiment uses the same seek trajectory (scaled in amplitude for seek length) for both axes (x-axis and y-axis) associated with the MEM mirror. This forces both axes to take the same length of time and to use the same "shape" to perform the move, and results in a straight line path between two points. Another embodiment uses a different seek trajectory, but an identical length, for each axis. By allowing different trajectories, with the same length, but different shapes, the mirror can be forced to follow any desired path such as arcs and straight lines, as well as others.

In one aspect of the invention, a method for moving a MEM system mirror in a well defined trajectory allows longer seeks to be used to reach a target position when compared with known MEM mirror movement methods that employ small step sizes due to lack of well defined seek trajectories.

In another aspect of the invention, a method for moving a MEM system mirror in a well defined trajectory allows a fast overall move time relative to the known methods that employ small step sizes due to lack of well defined seek trajectories.

According to one embodiment, a method of coordinating a MEMS mirror seek comprises the steps of defining a MEMS mirror seek trajectory between a first point and a second point; and adjusting the MEMS mirror such that a path formed by the MEMS mirror when moving between the first point and the second point is substantially a straight line.

According to another embodiment, a method of coordinating a MEMS mirror seek comprises the steps of defining a non-linear MEMS mirror seek trajectory characterized by a plurality of points; and adjusting the MEMS mirror such that a path formed by the MEMS mirror when moving between each pair of contiguous points within the plurality of points are substantially straight lines, such that the defined nonlinear seek trajectory is achieved in a piecewise linear fashion.

According to yet another embodiment, a method of coordinating a MEMS mirror seek comprises the steps of defining a MEMS mirror first seek trajectory between a first point and a second point; defining a MEMS mirror second seek trajectory between the first point and the second point; and adjusting the MEMS mirror such that a path formed by the MEMS mirror when moving between the first point and the second point in response to the first and second seek trajectories follows a desired composite pattern.

BRIEF DESCRIPTION OF THE DRAWINGS

Other aspects, features and advantages of the present invention will be readily appreciated, as the invention becomes better understood by reference to the following detailed description when considered in connection with the accompanying drawing figures wherein:

FIG. 1 is a plot diagram illustrating a seek trajectory associated with a MEMS mirror;

FIG. 2 is a plot diagram illustrating the MEMS mirror path followed by a coordinated axis seek that uses the seek trajectory depicted in FIG. 1 according to one embodiment of the present invention;

FIG. 3 is a flow chart depicting a method of performing a coordinated axis seek according to one embodiment of the present invention; and FIG. 4 is a flow chart depicting a method of performing a coordinated axis seek according to another embodiment of the present invention.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

FIG. 1 is a plot diagram 100 illustrating one possible seek trajectory 102 associated with a MEMS mirror. As stated herein before, when moving a MEMS mirror, the trajectory that is traversed may be important to the application. Those skilled in the optical switch art will readily appreciate this trajectory is critical, for example, in the optical switch market. The seek trajectory 102 is normalized to 100 mrad.

FIG. 2 is a plot diagram 200 illustrating the MEMS mirror path 202 followed by a coordinated axis seek according to one embodiment of the present invention that uses the seek trajectory 102 depicted in FIG. 1. Path 202 results when the same seek trajectory 102 (scaled in amplitude for seek length) is used for both the x-axis and the y-axis. The present inventors realized such a process will force both axes (x-axis and y-axis) to take the same length of time and use the same "shape" to perform the move, and will produce a straight line path between any two points. The present invention is not so limited however, and those skilled in the MEMS mirror art will appreciate that more complex paths can be achieved using the principles of the present invention simply by using a series of straight line moves. With continued reference to FIG. 2, the coordinated axis seek moves from a first point defined by x=0 mrad, y=−175 mrad to a second point defined by x=100 mrad, y=175 mrad.

As also stated herein before, without defining seek trajectories, the path that the MEMS mirror would take would be much less well defined, possibly forcing wider clearances, and/or slower overall move times from point to point, especially if the step size must be reduced. The method described herein above will result in a very well defined path, allowing longer seeks to be used to reach a target position. The present inventors also realized the resulting overall move time using this method will be very quick.

FIG. 3 is a flow chart depicting a method 300 of performing a coordinated axis seek according to one embodiment of the present invention as discussed in detail herein above.

FIG. 4 is a flow chart depicting a method 400 of performing a coordinated axis seek according to another embodiment of the present invention. By allowing different trajectories, with the same length, but different shapes, a MEMS mirror can be forced to follow substantially any desired path such as arcs and/or straight lines, among others. Performing a coordinated axis seek according to this embodiment can be seen to begin as described in block 402 by first defining a MEMS mirror first seek trajectory between two predetermined points. Next, as shown in block 404 a MEMS mirror second seek trajectory is defined between the same two predetermined points, wherein the first and second seek trajectories have the same length, but different shapes. Finally, as seen in block 406, the MEMS mirror is continuously re-positioned using one of the two predetermined points as a starting point and the remaining point as the end point, wherein the x-axis is forced to use the first seek trajectory while the y-axis is forced to use the second seek trajectory during the re-positioning process, such that re-positioning of the MEMS mirror follows a desired composite trajectory.

In view of the above, it can be seen the present invention presents a significant advancement in the art of MEMS mirror positioning techniques. Further, this invention has been described in considerable detail in order to provide those skilled in the MEMS mirror art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims that follow.

What is claimed is:

1. A method of coordinating a MEMS mirror seek, the method comprising the steps of:
   defining a MEMS mirror seek trajectory for moving a MEMS mirror between a first point and a second point; and
   adjusting the MEMS mirror such that a path formed by the MEMS mirror when moving between the first point and the second point in response to the seek trajectory is substantially a straight line.

2. The method according to claim 1 wherein the step of adjusting the MEMS mirror comprises positioning the MEMS mirror using the same seek trajectory for both the MEMS mirror x-axis and the MEMS mirror y-axis.

3. The method according to claim 2 wherein the step of adjusting the MEMS mirror further comprises scaling the same seek trajectory in amplitude for seek length.

4. The method according to claim 1 wherein the step of adjusting the MEMS mirror further comprises forcing both the MEMS mirror x-axis and the MEMS mirror y-axis to take the same length of time and use the same shape to perform a move.

5. A method of coordinating a MEMS mirror seek, the method comprising the steps of:
   defining a non-linear MEMS mirror seek trajectory for moving a MEMS mirror characterized by a plurality of points; and
   adjusting the MEMS mirror such that a path formed by the MEMS mirror when moving between each pair of contiguous points within the plurality of points are substantially straight lines, such that the defined non-linear seek trajectory is achieved in a piecewise linear fashion.

6. The method according to claim 5 wherein the step of adjusting the MEMS mirror comprises positioning the MEMS mirror using the same seek trajectory for both the MEMS mirror x-axis and the MEMS mirror y-axis between each contiguous pair of points within the plurality of points.

7. The method according to claim 6 wherein the step of adjusting the MEMS mirror further comprises scaling the same seek trajectory in amplitude for seek length.

8. The method according to claim 5 wherein the step of adjusting the MEMS mirror further comprises forcing both the MEMS mirror x-axis and the MEMS mirror y-axis to take the same length of time and use the same shape to perform a move between each contiguous pair of points within the plurality of points.

9. A method of coordinating a MEMS mirror seek, the method comprising the steps of:
   defining a MEMS mirror first seek trajectory for moving a MEMS mirror between a first point and a second point;
   defining a MEMS mirror second seek trajectory for moving a MEMS mirror between the first point and the second point; and
   adjusting the MEMS mirror such that a path formed by the MEMS mirror when moving between the first point and the second point in response to the first and second seek trajectories follows a desired composite pattern.

10. The method according to claim 9 wherein the first and second seek trajectories are constrained to have identical lengths.

11. The method according to claim 10 wherein the first seek trajectory is constrained to have a different shape than the second seek trajectory.

12. The method according to claim 9 wherein the first seek trajectory is constrained to have a different shape than the second seek trajectory.

13. The method according to claim 12 wherein the first and second seek trajectories are constrained to have identical lengths.

14. The method according to claim 9 wherein the step of adjusting the MEMS mirror such that a path formed by the MEMS mirror when moving between the first point and the second point in response to the first and second seek trajectories follows a desired composite pattern comprises forcing the MEMS mirror X-axis to move along the first seek trajectory while simultaneously forcing the MEMS mirror Y-axis to move along the second seek trajectory.

* * * * *